(12) United States Patent
Dai et al.

(10) Patent No.: US 8,274,603 B2
(45) Date of Patent: Sep. 25, 2012

(54) CHOOSING VIDEO DEINTERLACING INTERPOLANT BASED ON COST

(75) Inventors: Shengyang Dai, Evanston, IL (US);
Simon John Baker, Medina, WA (US);
Sing Bing Kang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 12/057,372

(22) Filed: Mar. 28, 2008

(65) Prior Publication Data
US 2009/0244367 A1    Oct. 1, 2009

(51) Int. Cl.
*H04N 7/01* (2006.01)
*H04N 11/20* (2006.01)

(52) U.S. Cl. ......... 348/448; 348/441; 348/447; 348/452

(58) Field of Classification Search ................ 348/441, 348/452, 447–448
See application file for complete search history.

(56) References Cited

U.S. PATENT DOCUMENTS

| | | | |
|---|---|---|---|
| 5,532,751 A | 7/1996 | Lui | |
| 6,094,232 A | 7/2000 | Bayazit et al. | |
| 6,181,382 B1 | 1/2001 | Kieu et al. | |
| 6,680,752 B1 | 1/2004 | Callway et al. | |
| 7,023,487 B1 | 4/2006 | Adams | |
| 7,126,643 B2* | 10/2006 | Song et al. | 348/448 |
| 7,280,709 B2 | 10/2007 | Minami et al. | |
| 7,321,396 B2 | 1/2008 | Jung et al. | |
| 7,339,626 B2 | 3/2008 | Jiang et al. | |
| 2004/0120605 A1 | 6/2004 | Lin et al. | |
| 2005/0179814 A1* | 8/2005 | Pau et al. | 348/448 |
| 2006/0290806 A1 | 12/2006 | MacInnis | |
| 2007/0064800 A1* | 3/2007 | Ha | 375/240.12 |
| 2007/0092010 A1* | 4/2007 | Huang et al. | 375/240.17 |
| 2008/0117975 A1* | 5/2008 | Sasai et al. | 375/240.16 |
| 2009/0231486 A1* | 9/2009 | Fang | 348/448 |

OTHER PUBLICATIONS

Li, et al., "A De-Interlacing Algorithm Using Markov Random Field Model", vol. 16, Issue 11,IEEE Transactions on Image Processing, 2007. pp. 1-11.
Kovacevic, et al., "Deinterlacing by Successive Approximation" IEEE Transactions on Image Processing, vol. 6, No. 2, Feb. 1997. pp. 339-344.
Vandendorpe, et al., "Motion-compensated conversion from interlaced to progressive formats", Signal Processing: Image Communication 6 (1994). pp. 193-211.
Lee, et al., "Adaptive Scan Rate Up-Conversion System Based on Human Visual Characteristics", IEEE Trans. Consumer Electron. v46 i4. 2000. pp. 999-1006.
Ouyang, et al., "Advanced Motion Search and Adaptation Techniques for Deinterlacing", IEEE International Conference on Multimedia and Expo, Jul. 2005. ICME 2005. pp. 374-377.
Alparysoft v2.0. http://www.alparysoft.com/.
Haan, et al., "Deinterlacing—An Overview", Proceedings of the IEEE, vol. 86, No. 9, Sep. 1998. 1839-1857.

(Continued)

*Primary Examiner* — Kristine Kincaid
*Assistant Examiner* — Gigi L Dubasky

(57) ABSTRACT

Deinterlacing of video involves converting interlaced video to progressive video by interpolating a missing pixel in the interlaced video from other pixels in the video. A plurality of interpolants are provided, each of which interpolates a pixel value from other pixels that are nearby in space and/or time. The data costs of using the various interpolants is calculated. A particular one of the interpolants is chosen based on the data costs associated with the various interpolants. The chosen interpolant is used to interpolate the value of the missing pixel. The interpolated pixel value may be refined based on exemplars. The exemplars may be taken from the video that is being deinterlaced.

18 Claims, 4 Drawing Sheets

OTHER PUBLICATIONS

Li, et al., "Discontinuity—Adaptive Deinterlacing Scheme Using Markov Random Field Model", IEEE International Conference on Image Processing, 2006, Oct. 8-11, 2006 pp. 393-396.

Wang, et al., "Hybrid De-Interlacing Algorithm Based on Motion Vector Reliability", IEEE Transactions on Circuits and Systems for Video Technology, vol. 15, No. 8, Aug. 2005. pp. 1019-1025.

Haan, "IC for Motion Compensated De-Interlacing, Noise Reduction, and Picture Rate Conversion", IEEE Transactions on Consumer Electronics, vol. 45, Issue 3, Aug. 1999 pp. 617-624.

Delogne, et al., "Improved Interpolation, Motion Estimation, and Compensation for Interlaced Pictures", IEEE Transactions on Image Processing, vol. 3, No. 5, Sep. 1994. pp. 482-491.

Freeman, et al., "Learning Low-Level Vision", International Journal of Computer Vision 40(1), 2000 pp. 25-47.

Baker, et al., "Limits on Super—Resolution and How to Break Them", IEEE Transactions on Pattern Analysis and Machine Intelligence, Sep. 2002, vol. 24, Issue 9, pp. 1167-1183.

Zhao, et al., "Making the best of legacy video on modern displays", Digest of the SID '06, vol. 37, pp. 1888-1891.

Lee, et al., "Motion Adaptive Deinterlacing via Edge Pattern Recognition", IEEE International Symposium onCircuits and Systems, 2007. ISCAS 2007. May 27-30, 2007, pp. 2662-2665.

Yang, et al., "Motion Compensation Assisted Motion Adaptive Interlaced-to-Progressive Conversion", IEEE Transactions on Circuits and Systems for Video Technology, vol. 14, No. 9, Sep. 2004. pp. 1138-1148.

Delogne, et al., "Conversion from Interlaced to Progressive Formats by Means of Motion Compensation Based Techniques", International Conference on Image Processing and its Applications, 1992., Apr. 7-9, 1992. pp. 409-412.

Biswas, et al., "Performance Analysis of Motion-Compensated De-Interlacing Systems", IEEE Transactions on Image Processing, vol. 15, No. 9, Sep. 2006. pp. 2596-2609.

Patti, et al., "Robust Methods for High Quality Stills from Interlaced Video in the Presence of Dominant Motion", IEEE Transactions on Circuits and Systems for Video Technology, vol. 7, Issue 2, Apr. 1997 pp. 328-342.

"Smart Deinterlacer Filter" http://neuron2.net/smart/smart.htm.

Chang, et al., "Video De-Interlacing by Adaptive 4-Field Global/ Local Motion Compensated Approach", IEEE Transactions on Circuits and Systems for Video Technology, vol. 15, No. 12, Dec. 2005. pp. 1569-1582.

"Virtualdub" http://www.virtualdub.org/index.htm.

"VirtualDub Filters" http://www.guthspot.se/video/.

* cited by examiner

CHOOSING VIDEO DEINTERLACING INTERPOLANT BASED ON COST

BACKGROUND

Video may be in progressive or interlaced form. In progressive video, all of the lines of a video frame are drawn in sequence. Interlaced video, on the other hand, comprises a sequence of fields, where each field contains either the even or odd lines of a frame. The fields alternate between the even and odd lines of a frame, so, over time, scan lines throughout the frame are displayed in space, even though a given field does not contain all of the lines together at any point in time. Because of the physics of the Cathode Ray Tube (CRT) display technology, a CRT monitor or television set can display interlaced video natively without any apparent artifacts. Other display technologies, such as Liquid Crystal Display (LCD) and plasma, use some form of deinterlacing to produce progressive video by filling in the missing lines in each field when that field is displayed.

Deinterlacing is typically performed by interpolating a pixel that is missing in a frame from other pixels that are present nearby in either space or time. A pixel's value may be interpolated based on pixels that appear vertically above and/or below that pixel in the same field (spatial interpolation), or based on pixels that appear in the same spatial position in the previous and/or subsequent fields (temporal interpolation). For example, in order to interpolate the value of a pixel, the values of the surrounding pixels (either in space or time) could be averaged. (Averaging could be performed on values of any type of pixel representation, such as grayscale, RGB values, YUV values, etc.).

Some deinterlacing techniques choose how to interpolate a missing pixel based on whether the pixel appears to be moving or not. If the pixel is moving, such techniques typically interpolate the pixel spatially; otherwise, they interpolate the pixel temporally. These techniques may produce various kinds of visual flaws.

SUMMARY

De-interlacing of video may be performed by evaluating the data cost of using different interpolants, and choosing the interpolant that minimizes that cost. An interpolant derives a value of a target pixel based on other pixels in the same video. Different interpolants have different ways of interpolating a pixel value from other pixels. For example, the value of a pixel could be interpolated spatially (by considering pixels that occur at the same time as the pixel to be interpolated, and are nearby in space), or temporally (by considering pixels that appear at the same point in space as the pixel to be interpolated, and are nearby in time). Interpolants are evaluated based on how likely they are to predict the correct value of a pixel. Interpolants that are deemed likely to predict the correct value are considered to have a lower data cost for that pixel. Data cost may be viewed as a measure of the amount of loss or distortion of data that a particular interpolant causes. In determining which interpolant is used to choose the value of a target pixel, interpolants with lower data costs are favored over interpolants with higher data costs.

Evaluation of an interpolant's data cost is made by downsampling the interlaced video, in both the spatial and time dimensions, to create progressive video at a lower resolution than the interlaced video. Since the lower-resolution progressive video does not contain missing lines, all of the pixel values in the downsampled video are known. Pixels in a downsampled frame may be interpolated using the various interpolants. The interpolated pixel values are compared with the actual pixel values as a measure of how well the interpolant performs in a given region of the frame. A data cost is assigned based on how much distortion the interpolant introduces relative to a pixel's actual value.

To interpolate a pixel of the interlaced video, one or more pixels from the downsampled video that correspond in space and time, approximately, with the pixel to be interpolated are combined or averaged in some manner. The interpolant with the minimal data cost for a given pixel in the downsampled video may be chosen as the interpolant for the corresponding pixel in the interlaced video. A regularization factor may be used to bias the choice of interpolant in favor of using the same interpolant, or similar interpolants, within a given region. The pixel value may be refined based on exemplars, which may be taken from the video that is undergoing deinterlacing.

Choosing the interpolant that minimizes data cost may be set up as a Markov Random Field (MRF). In the MRF, each pixel is a node, and each interpolant is a label that may be applied to a given node. A cost function that calculates the data cost may be defined. The cost function may assign a value to a given interpolant's ability to predict the correct value of a given pixel. An MRF optimization condition is then set up, and the nodes may then be labeled in a way that minimizes data cost based on the optimization condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Deinterlacing of video is performed by interpolating the missing (undefined) pixels in a field from other pixels that are present in the video. An interpolant is a function that is used to perform this interpolation. There are various kinds of interpolants, such as those that interpolate a pixel's value from other pixels that are proximate in space, time, or some combination of space and time. Deinterlacing techniques generally focus on choosing the right interpolant for a given pixel. These techniques may attempt to determine whether a pixel is moving or non-moving. If the pixel is found to be moving, then these techniques normally choose a spatial interpolant that interpolates the pixel's value based on spatially proximate pixels in the same temporal field. If the pixel is found to be non-moving, then the pixel's value may be interpolated temporally as a function of pixels in other temporal fields that occupy the same location in space. These deinterlacing techniques may produce various types of visual flaws.

A Markov Random Field (MRF) is a framework in which a problem may be modeled as that of applying labels to nodes in a graph. In theory, an MRF could be used to model deinterlacing by treating each pixel as a node, and treating the space of possible pixel values as labels. In this model, deinterlacing is a matter of determining which label to apply to each node. However, the large set of possible pixel values (video displays often have 256 or more different color values that a pixel can be set to) makes this model computational impractical to use. MRFs have $O(n^2)$ complexity, with n being the number of labels. Deinterlacing is normally performed in real-time on a receiving device, and it may not be practical to equip video devices with sufficient computational power to solve an MRF with a large label space. However, the problem of choosing interpolants for pixels may also be set up as an MRF, with the label space being the set of possible interpolants. Since there may be a relatively small number of interpolants from which to choose, an MRF provides a practical way to choose interpolants. (In the examples herein, an interpolant is chosen from a set of seven interpolants, although any number of interpolants could be used.) The subject matter described herein provides a way to use an MRF framework, and related techniques, to choose the interpolants to derive values of missing pixels in interlaced video.

Figure 1:
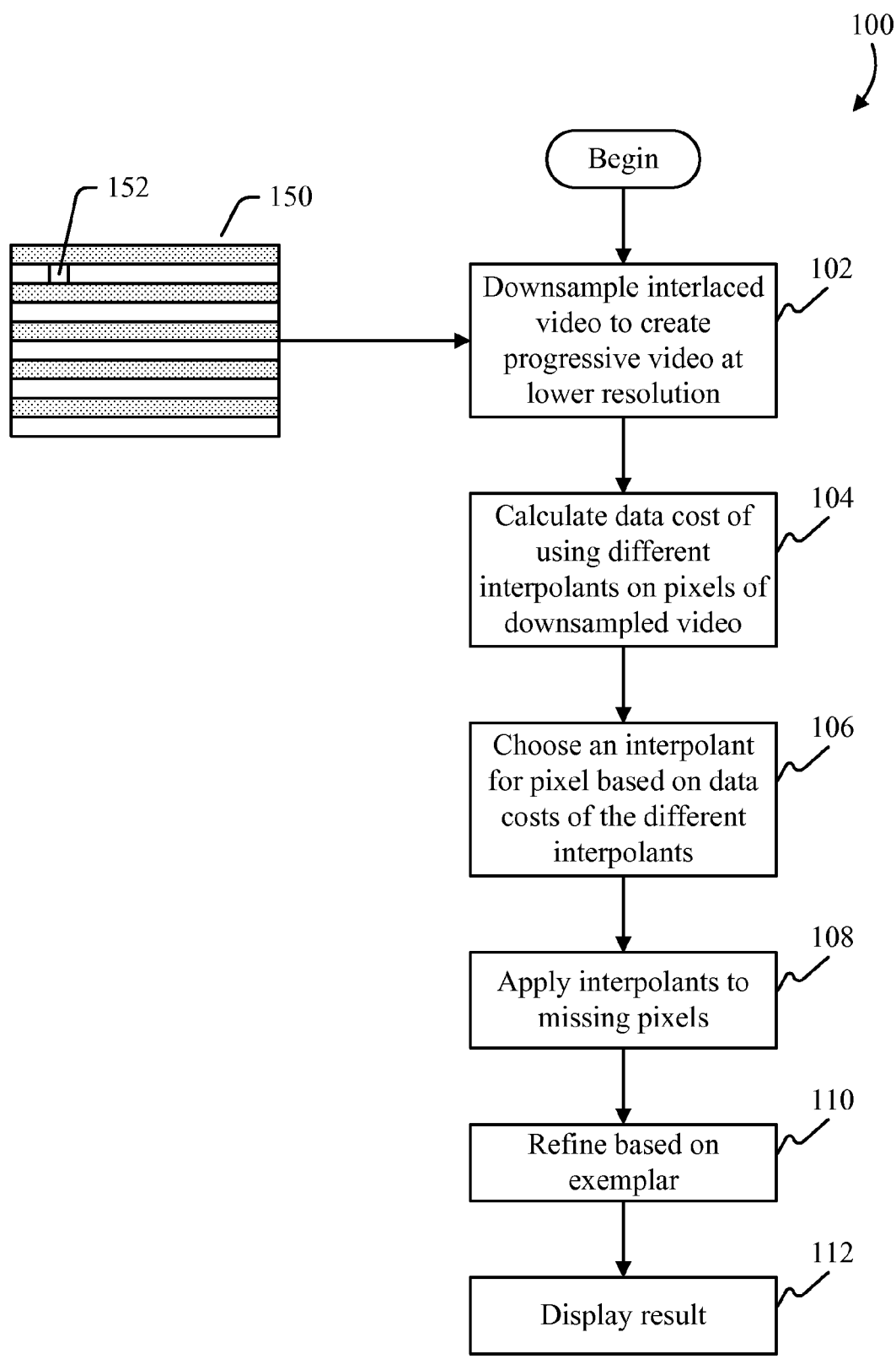
FIG. 1 is a flow diagram of an example process of deinterlacing video.

Turning now to the drawings, FIG. 1 shows an example process 100 of deinterlacing video. The flow diagram in FIG. 1 shows an example in which stages of a process are carried out in a particular order, as indicated by the lines connecting the blocks, but the various stages shown in FIG. 1 may be performed in any order, or in any combination or sub-combination, and are not limited to the particular order or combination shown.

As shown in FIG. 1, interlaced video 150 is received as input and is downsampled (at 102). Interlaced video 150 comprises a plurality of fields that are spread out across time. Each field has data present in either the even or odd rows (scan lines) of the spatial field. The scan lines that are not present in a particular field are undefined. The fields that contain the even and odd scan lines alternate through time, so that the first field may contain the even scan lines, the second field may contain the odd scan lines, and so on. In FIG. 1, interlaced video 150 is represented by a single field—i.e., the field that represents space at a particular point in time in interlaced video 150. The dotted stipple pattern shows the scan lines that are present in this field, and the blank (white) portions of the field show the scan lines that undefined, or not-present, in the field. Each line is made up of pixels (such as pixel 152).

Figure 2:
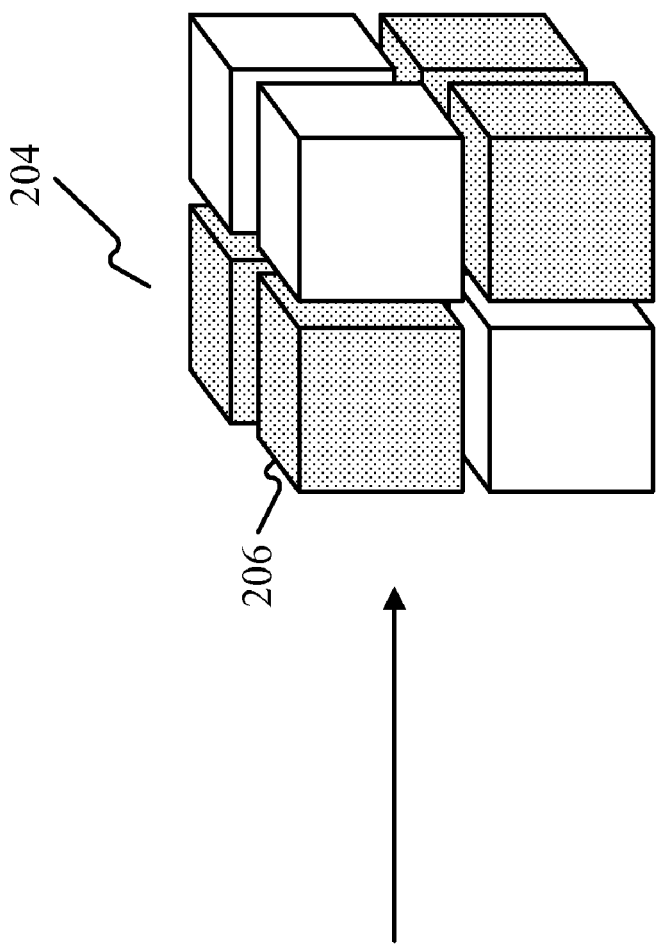
FIG. 2 is a block diagram of interlaced video that is downsampled to progressive video.
Figure 2:
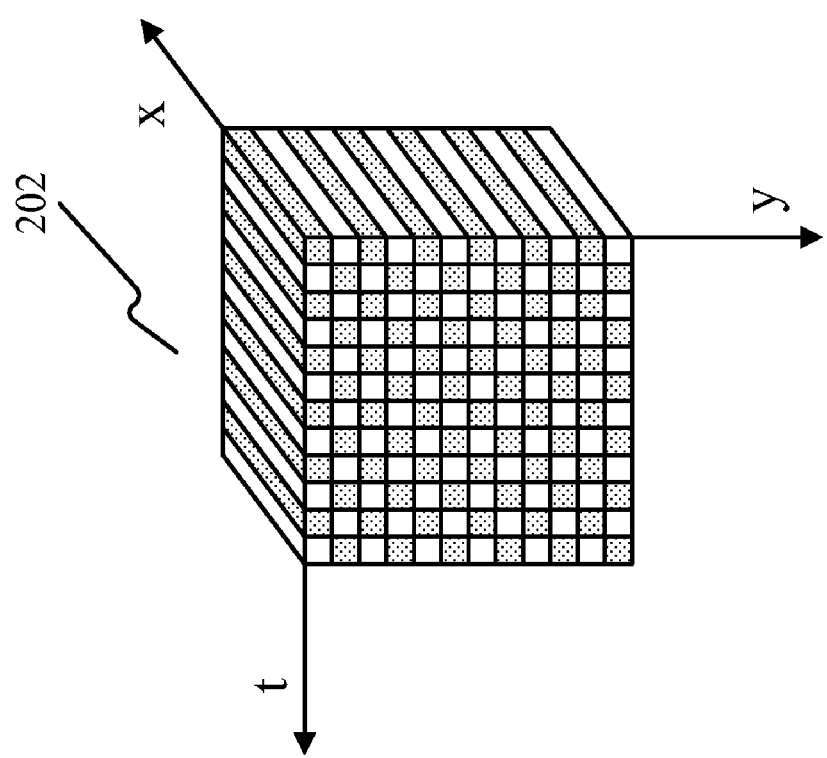

Downsampling of interlaced video is shown in FIG. 2. Interlaced video 202 is shown in three dimensions: two spatial dimensions (x and y), and the time dimension (t). Thus, interlaced video 202 comprises a series of fields, each of which is shown in FIG. 2 as a plane perpendicular to the t axis. In the spatial dimensions, x represents the horizontal direction and y represents the vertical direction. Each successive field in time contains either the even or odd scan lines (rows) in the spatial domain. Thus, if pixels are identified by the pair (x,y), then pixels in a given field have values that are defined where y is even, or are defined where y is odd. However, pixels values are not defined for both even and odd values of y within the same field. Scan lines for which pixels have defined values are represented in FIG. 2 by the dotted stipple pattern, and scan lines where pixels are undefined are represented by blank (white) portions. The fields in which the even or odd scan lines are present alternate in succession through time.

Downsampling is a process that creates low resolution video from high resolution video, by sampling fewer than all of the pixels in the original high resolution video. For example, for a given stream of video, one could sample alternate pixels in the horizontal, vertical, and time dimensions, thereby creating video that has half the resolution in each dimension as the original video. (Numerically, half the pixels in each of the three dimensions results in a sample that has one-eighth as many pixels as the original video.) When downsampling is performed on interlaced video, it is possible to create progressive video at a lower resolution than the original interlaced video. Since a field of interlaced video is defined at alternate horizontal lines, sampling pixels from those (alternate) lines that are defined results in a progressive frame defined at every line—albeit at a lower resolution that the original interlaced field. (However, if the alternate lines that are chosen for sampling are the undefined lines in the field, then the result does not contain a progressive frame; instead, the result would contain no information.)

For interlaced video in the three dimensions x, y, and t, there are eight possible downsamplings that may be created by sampling alternate pixels. In particular, for each dimensions, one may choose to sample either the even values or the odd values. Since there are two possible choices for each dimension (even or odd), and there are three variables (x, y, and t) that can be set to even or odd, there are eight possible ways (2×2×2=8) to subsample alternate pixels in the three dimensions. Four of these combinations avoid the undefined lines and thus yield progressive video. The other four combinations sample the undefined lines and thus yield no information. For example, if in a stream of interlaced video, the odd numbered scan lines (i.e., those pixels in for which y is an odd number) are defined for t=1, 3, 5, . . . , then progressive video may be obtained by sampling even-numbered scan lines at odd-numbered time slices, or by sampling odd-numbered scan lines at even-numbered time slices. Mathematically, the following equations (1) show the eight ways to downsample interlaced video based on eight possible displacements or offsets into the video (which represent eight different combinations of sampling the even- or odd-numbered pixels in each dimension). If I:x×y×t→p defines a stream of interlaced video by producing the pixel value p (which may in any form, such as grayscale, RGB, YUV, etc.) at a given point in time and space (x,y,t), then $P_1$ through $P_8$ are functions that return eight different downsamplings of I. If the odd-numbered scan lines are defined in fields having even-numbered values of t, then $P_1$ through $P_4$ are progressive video, and $P_5$ through $P_8$ are undefined:

$$P_1(x,y,t)=I(2x-1,2y-1,2t)$$

$$P_2(x,y,t)=I(2x-1,2y,2t-1)$$

$$P_3(x,y,t)=I(2x,2y-1,2t)$$

$$P_4(x,y,t)=I(2x,2y,2t-1)$$

$$P_5(x,y,t)=I(2x-1,2y-1,2t-1)$$

$$P_6(x,y,t)=I(2x-1,2y,2t)$$

$$P_7(x,y,t)=I(2x,2y-1,2t-1)$$

$$P_8(x,y,t)=I(2x,2y,2t) \qquad (1)$$

In FIG. 2, 204 represents eight possible instances of downsampling of interlaced video 202. The four blocks with a dotted stipple pattern represent the downsamplings that result in progressive video ($P_1$ through $P_4$), and the four blocks with a blank (white) pattern represent the downsamplings that contain undefined pixels ($P_5$ through $P_8$). Each of the blocks with the dotted stipple pattern is an instance of downsampled progressive video (such as instance 206). (Due to the two-dimensional nature of FIG. 2, the lower-most, left-most, rearmost white block in 204 is occluded by other blocks; however it will be understood that 204 contains eight blocks.)

Prior to downsampling, each field of the interlaced video may be pre-filtered with a Gaussian blur in order to reduce aliasing.

Returning to FIG. 1, at 104 the progressive video created by downsampling is used to calculate the data cost associated with using various interpolants. An interpolant is a function, F:I×x×y×t→p, that interpolates the value of a pixel (x,y,t) in video stream I based on one or more other pixels in the video. Normally, interpolants are used to derive the value of undefined pixels in a field of interlaced video. However, when an interpolant is applied to a pixel in progressive video, the interpolated value of that pixel may be compared to the pixel's actual value as a way of judging how good the interpolant is at choosing a value for that pixel. Since low-resolution progressive video is created through downsampling of interlaced video, frames of the progressive video are similar in content to the fields of interlaced video whose missing pixels are to be interpolated. Thus, the low-resolution progressive fields provide a useful proving ground to assess how well a given interpolant is likely to perform on the actual pixels to be interpolated.

In general, a system that implements the subject matter described herein may have L interpolants, $F_1$ through $F_L$, and may use the downsampled video described above to evaluate how well these interpolants perform in a given region of a frame. Equations (2) through (8), which are described below, show seven example interpolants, $F_1$ through $F_7$.

Example interpolant $F_1$ is an example of a vertical spatial interpolant, and is similar to what is called "bob deinterlacing":

$$F_1(I, x, y, t) = \frac{1}{2}(I(x, y-1, t) + I(x, y+1, t)) \quad (2)$$

Example interpolant $F_2$ is an example of a temporal interpolant, and is similar to what is called "weave deinterlacing":

$$F_2(I, x, y, t) = \frac{1}{2}(I(x, y, t-1) + I(x, y, t+1)) \quad (3)$$

Vertical spatial interpolation using $F_1$ may lead to jagged edges when the dominant edge direction is not horizontal or vertical. To alleviate these effects, interpolants $F_3$ and $F_4$ may be used, which interpolate spatially at 45° and 135°:

$$F_3(I, x, y, t) = \frac{1}{2}(I(x-1, y-1, t) + I(x+1, y+1, t)) \quad (4)$$

$$F_4(I, x, y, t) = \frac{1}{2}(I(x+1, y-1, t) + I(x-1, y+1, t)) \quad (5)$$

Temporal interpolation using $F_2$ may lead to ghosting around the edges of objects because I(x,y,t−1) may be a pixel in the background and I(x,y,t+1) may be a pixel in the foreground (or vice versa). To reduce this ghosting, interpolants $F_5$ and $F_6$ may be used. These interpolants are suitable, for example, in regions that are about to appear or are about to be occluded:

$$F_5(I,x,y,t)=I(x,y,t+1) \quad (6)$$

$$F_6(I,x,y,t)=I(x,y,t-1) \quad (7)$$

$F_7$ is a motion-compensation-based interpolant. For this interpolant, optical flow may be calculated using any optical flow algorithm. Suppose the calculated flow is u(x,y,t), v(x,y,t), i.e., pixel I(x,y,t) moves to pixel I(x+u(x,y,t), y+v(x,y,t), t+1 in the next field. An interpolation may be made by following the flow forward and backward, using the following equation:

$$F_7(I, x, y, t) = \frac{1}{2}(I(x+u(x, y, t), y+v(x, y, t), t+1) + I(x-u(x, y, t), y-v(x, y, t), t-1)) \quad (8)$$

Since the flow may take non-integral values and the destination may be a missing pixel, I(x+u(x,y,t), y+v(x,y,t), t+1) and I(x−u(x,y,t), y−v(x,y,t), t−1) may be calculated by interpolating the known pixels at t+1 and t−1, respectively.

Interpolants $F_1$ through $F_7$ are merely examples. The subject matter described herein is independent of any particular choice of interpolant. Other interpolants may be used in addition to or instead of the interpolants described herein. Moreover, fewer interpolants than those shown herein could be used.

As noted above, process 100 assesses the performance of the various interpolants by using those interpolants to interpolate pixels of known values in the progressive video that was created by downsampling the interlaced video. To evaluate a given interpolant, a value, $C_i$, may be calculated, which assesses how much deviation from a pixel's actual value results when a particular interpolant, $F_i$, is used to interpolate that pixel. This evaluation may be made using samples $P_1$ through $P_4$. Since each of those samples is progressive, there are no missing pixels in the samples, thereby allowing a pixel's interpolated value to be compared with its actual value. In general, the greater the value of $C_i$, the greater the difference between the interpolated and actual values of the pixel:

$$C_i(l_{xyt},x,y,t)=\|P_i(x,y,t)-F(P_i,x,y,t)\|^2 \quad (9)$$

In equation (9), $l_{xyt}$ is a label (i.e., a particular interpolant) to be applied to the pixel located in space and time at (x,y,t). $P_i-F_i$ is the difference between the pixel's actual value and the pixel's interpolated value. The difference in the vectors of color values (whether grayscale, RGB, YUV or another color representation) are combined to give a single scalar value using any norm (as indicated by the $\|\cdot\|$ term). $C_i$ thus represents the data cost (e.g., how much data is lost, distorted, etc.) of applying label (interpolant) $l_{xyt}$ to pixel (x,y,t). (In a Markov Random Field, a label is applied on a per-node basis. In the use of an MRF described herein, pixels are the nodes. Thus, in describing a label, it is appropriate to subscript the label by the node to which it applies. Since the tuple (x,y,t) defines a node, l is subscripted by that tuple ($l_{xyt}$) to indicate the node to which the label applies.)

To evaluate the cost of using a particular interpolant to interpolate a missing pixel (x,y,t) in the interlaced video, one may calculate the data cost, D, as the weighted average data cost of the four nearest neighboring pixels that are present in the interlaced video (two vertical neighbors and two temporal neighbors). Thus, $$D(l_{xyt}, x, y, t) = w_{ij} \sum_{(i,j) \in Q} C_k\left(l_{xyt}, \left\lfloor \frac{x}{2} \right\rfloor, \left\lfloor \frac{y+i}{2} \right\rfloor, \left\lfloor \frac{t+j}{2} \right\rfloor\right) \quad (10)$$

In this equation, Q={(−1,0), (1,0), (0,−1), (0,1), k=2*(x mod 2)+(y+i) mod 2, and ⌊•⌋ is the floor function, which returns the integral part of its operand. $w_{ij}$ are weights. For example, for uniform averaging, $w_{ij}$=0.25 for all i and j. The summation expression in equation (10) thus calculates C for the four pixels in that correspond to the four nearest neighbors (in space and time) of (x,y,t).

Since the value D calculates the cost of a particular interpolant based on the interpolant's performance on four instances of downsampled video, using that value as a cost assumes that an interpolant will perform about as well on a region of the interlaced video as it does in a corresponding region of downsampled progressive video. Empirical results have shown the validity of this assumption.

At 106 in FIG. 1, an interpolant is chosen based on the data costs that were calculated at 104 (e.g., by finding the interpolant with the lowest data cost). The interpolant may be chosen by minimizing the data cost associated with assigning a particular interpolant to a particular pixel. If M is the set of missing pixels (e.g., in an interlaced video stream), then choosing an interpolant may be performed by finding the MRF-labeling that minimizes the following expression:

$$\sum_{(x,y,t)\in M}\left[D(l_{xyt}, x, y, t) + w \cdot \sum_{\substack{(x',y',t') \\ \in N(x,y,t)}} R(l_{xyt}, l_{x'y't'})\right] \quad (11)$$

In expression (11), the second addend (the R term) is a term that takes into account the regularity of labeling in a particular neighborhood. (N(x,y,t) is the neighborhood of pixel (x,y,t), which may be defined as an arbitrary spatial/temporal distance from (x,y,t). The neighborhood may be chosen in any number of dimensions.) This term may encourage consistency among the labels in that neighborhood. Since interpolants may be chosen on a pixel-by-pixel basis, in theory the interpolants for neighboring pixels could follow a seemingly random pattern. However, in normal video, similar choices would tend to cluster together, so an anomalous choice of interpolant at a particular pixel may represent a discontinuity or unevenness in the resulting deinterlaced video. Thus, the R term allows a bias toward maintaining regularity to be given some influence in choosing an interpolant. The factor w is a weight that determines how much influence the bias toward regularity is to be given.

Regularity is calculated by comparing a pair of interpolants: one assigned to a given pixel, and another assigned to another pixel in the given pixel's neighborhood. This pair of pixels is compared to determine whether any particular types of transitions are be occurring within a given neighborhood. For example, the value of R may be chosen to disfavor transitions from spatial interpolation to temporal interpolation within the same neighborhood, by assigning higher values to R (i.e., higher costs) for spatial/temporal pairs of interpolants than for a pair of spatial interpolants or a pair of temporal interpolants. In one example, where the various interpolants are $F_1$ through $F_7$ described in equations (2) through (8) above, the values of R may be set proportional to the values shown in Table 1.

TABLE 1

|   |   | \multicolumn{7}{c}{l'} |
|---|---|-----|-----|-----|-----|-----|-----|-----|
|   |   | 1   | 2   | 3   | 4   | 5   | 6   | 7   |
| l | 1 | 0.0 | 5.0 | 0.3 | 0.3 | 5.0 | 5.0 | 1.0 |
|   | 2 | 5.0 | 0.0 | 5.0 | 5.0 | 4.0 | 4.0 | 3.0 |
|   | 3 | 0.3 | 5.0 | 0.0 | 0.6 | 5.0 | 5.0 | 1.0 |
|   | 4 | 0.3 | 5.0 | 0.6 | 0.0 | 5.0 | 5.0 | 1.0 |
|   | 5 | 5.0 | 4.0 | 5.0 | 5.0 | 0.0 | 3.0 | 1.0 |
|   | 6 | 5.0 | 4.0 | 5.0 | 5.0 | 3.0 | 0.0 | 1.0 |
|   | 7 | 1.0 | 3.0 | 1.0 | 1.0 | 1.0 | 1.0 | 0.0 |

The proportionality constant (i.e., the amount by which the quantities in Table 1 are to be multiplied in order to calculate R) may be set to 1.2 for transitions within the same row, 0.6 for transitions across rows in the same frame, and 0.12 for transitions across time. The diagonal elements in the table (i.e., representing pairs of pixels that have the same assigned label) are 0.0, which encourages local smoothness in the labels. Other elements in the table may be set to various non-zero values. For example, the element at (1,2) in Table 1 is a relatively large number, which discourages transitions between spatial and temporal interpolation. ($F_1$ is a spatial interpolant, and $F_2$ is a temporal interpolant.) On the other hand, the elements at (1,3) and (1,4)—representing transitions between vertical interpolation and spatial interpolation at 45° and 135° are smaller, which tends to discourage this type of transition less than a spatial-to-temporal transition.

The mechanisms described herein allow a trade-off between computational cost and the quality of the results. To obtain fast performance, the neighborhood in expression (11) may be set to one dimension (N(x,y,t)={(x−1,y,t), (x+1,y,t)}, and the MRF represented by expression (11) may be optimized by dynamic programming. Greater quality may be obtained by setting the neighborhood to two dimensions (N(x,y,t)={(x−1,y,t), (x+1,y,t), (x,y−2,t), (x,y+2,t)}) or 3D (N(x,y,t)={(x−1,y,t), (x+1,y,t), (x,y−2,t), (x,y+2,t), (x,y,t−2), (x,y,t+2)}). In the 2D and 3D cases, expression (11) may be optimized using belief propagation. Optimizing over the entire 3D space-time may not be practical, so in the 3D case optimization may be performed over a sliding window of the previous K frames (where K is assigned a value such as K=3).

When an interpolant has been chosen for a particular missing pixel in interlaced video 150, the interpolant is then applied to the pixel in order to generate a value for that pixel (at 108, in FIG. 1). As noted above, an interpolant is a function, F:I×x×y×t→p, which generates an interpolated pixel value, p, for a given stream of interlaced video, I, and a given pixel (x,y,t) within that video stream. The value p may be generated in any form in which a pixel value may be represented, such as grayscale, RGB, YUV, etc. If the process as described above has chosen the $i^{th}$ interpolant, then the value of p is calculated by applying the chosen function $F_i$.

At 110, the progressive video that has been created by interpolation may be refined based on one or more exemplars. The exemplars may be generic exemplars, or they may be taken from the video that is being deinterlaced. Example ways of using exemplars to refine the deinterlaced video are described subsequently. If interpolation produces a particular value for a pixel, exemplar-based refinement may be used to change that value to a different value before the result is displayed.

At 112, the result of an interpolation (and refinement, if such refinement has been performed) is displayed. Thus, a frame of deinterlaced video may be drawn on a display, and the frame may include a pixel whose appearance is based on a value that has been interpolated and/or refined by the techniques described herein.

Regarding the use of exemplars to refine the deinterlaced video, the following describes example techniques for using such exemplars. An offline training phase may be implemented and used to collect a set of exemplar pairs $\{f(F_i,O_i)|i=1\ldots,N\}$, where $F_i$ is a vector of features of the input and $O_i$ is the output correction. (In this discussion of exemplars, the capital letter F is used to represent a feature vector. The capital letter F is also used elsewhere herein to refer to interpolants. It will be apparent from context whether a particular instance of the capital letter F refers to a feature vector or to an interpolant.) The training phase starts with a progressive video $I_p(x,y,t)$. Interlaced video, $I_i(x,y,t)$, may be generated by discarding the appropriate pixels from the progressive video. The deinterlacing techniques described herein may then be applied to the interlaced video. The output of this deinterlacing is progressive video, $I_o(x,y,t)$. A high frequency correction $$I_h(x,y,t)=I_p(x,y,t)-I_o(x,y,t) \quad (12)$$

may be computed, and this correction may be learned as a function of the mid frequency:

$$I_m(x,y,t)=I_o-G_\sigma*I_o \quad (13)$$

where $G_\sigma$ is a Gaussian blur kernel and * denotes convolution. A normalization factor may be computed as $$I_n(x,y,t)=\sqrt{G_\sigma*I_m^2+\epsilon} \quad (14)$$

where $\epsilon$ is a small positive regularizing constant. Normalization may then be performed as $\bar{I}_h(x,y,t)=I_h(x,y,t)/I_n(x,y,t)$ and $\bar{I}_m(x,y,t)=I_m(x,y,t)/I_n(x,y,t)$. For each missing pixel $(x,y,t)$ in the interlaced video $I_i(x,y,t)$, an exemplar may be generated with a 20-dimensional feature vector:

$$F=(\bar{I}_m(x+j,y+k,t)) \quad (15)$$

where $j=-2, -1, 0, 1, 2$ and $k=-3, -1, 1, 3$. An output correction may also be generated as follows:

$$O=(\bar{I}_h(x-2,y,t),\bar{I}_h(x-1,y,t),\bar{I}_h(x,y,t),\bar{I}_h(x+1,y,t),\bar{I}_h(x+2,y,t)) \quad (16)$$

The exemplar (F,O) may be added to the training set if: (1) the magnitude of the gradient is above a threshold (which may be understood as a measure of the "interestingness" of the exemplar), and (2) the magnitude of the output correction is not greater than that of both of its neighbors on the same row (which may be understood as a finding that the exemplar is not an "extreme" example).

During processing of video, $I_o$, $I_m$, $I_n$, and $\bar{I}_m$ may be computed for interlaced video input. For each missing pixel (x,y, t), the mid-frequency feature vector F may be computed using equation (15). An approximate nearest neighbor search may then be performed in the exemplar set to find the top 20 corrections $O_i$: $i=1,\ldots, 20$, and then the normalization may be undone. The following are three example methods of choosing the final correction to apply based on these candidates: (1) Mean: computing the mean of the correction vectors $O_i$ and taking the third component as the correction; (2) Median: computing the median of the third components of the correction vectors $O_i$; (3) MRF-based: setting up a one-dimensional MRF along each scan-line using the match cost as the data term and the distance between overlapping elements of the correction vectors as the regularity term.

Deinterlacing provides the opportunity to use exemplars extracted from the video that is actually being processed. The following is a way to learn video-specific exemplars as the video is processed.

Exemplar-based refinement may be performed with two exemplar sets: a set of generic exemplars learned before the algorithm is run, and a fixed-size set of video specific exemplars, initialized to be empty. As the video is processed, regions for which the temporal interpolant $F_2$ is chosen (described above in equation (3)) are processed in the same way as in the offline training phase. Exemplars are added to the video specific set as above: (1) if they are "interesting" enough (as determined based on a finding that the magnitude of the gradient is above a threshold), and (2) if they are not extreme (as determined by a finding that the output correction is not greater than that of both of its neighbors on the same row). When the video specific exemplar set becomes full, exemplars are discarded using a first-in first-out (FIFO) queue. Both the generic and video-specific exemplar sets are then used.

A variety of extensions of this algorithm are possible (see Section 6), including batch processing where exemplars are taken from everywhere in the video.

Figure 3:
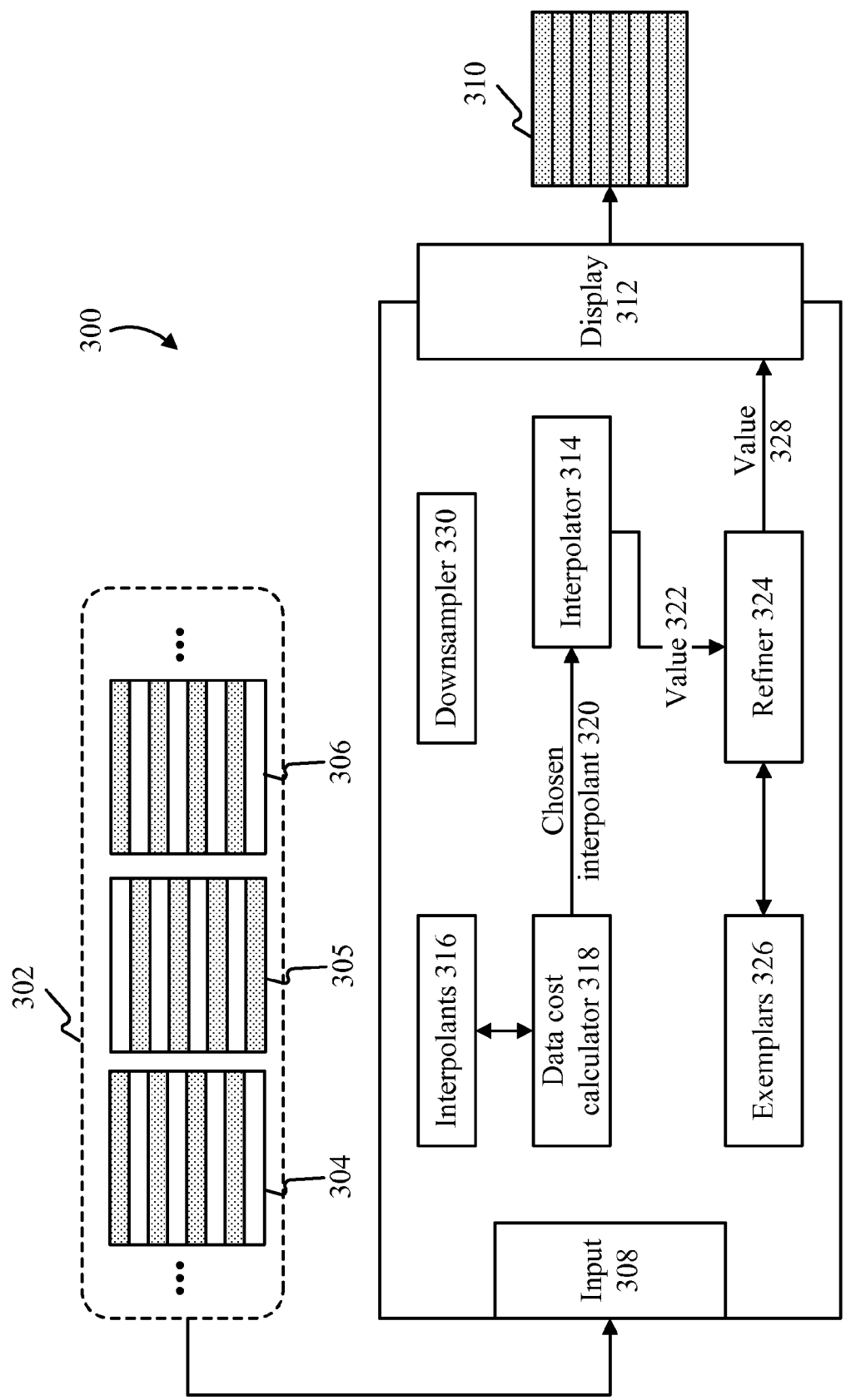
FIG. 3 is a block diagram of an example system in which interlaced video may be deinterlaced and displayed.

FIG. 3 shows an example system 300 in which interlaced video 302 may be deinterlaced and displayed. Interlaced video 302 comprises a plurality of fields, such as fields 304, 305, and 306. The fields alternately have pixels defined at the odd and even scan lines. Fields 304 and 306 have pixel values defined at the odd-numbered scan lines (starting with line one at the top), and field 305 has pixel values defined at the even numbered scan lines. The dotted stipple pattern indicates a scan line with defined pixel values, and the blank (white) space indicates a scan line whose pixel values are undefined in that field. Depending on the interpolants, the missing pixels in 305 are filled using available ones in 304, 305, and 306.

System 300 receives interlaced video 302 through an input 308. Input 308 could take any form, such as a network interface, serial or parallel port, Universal Serial Bus (USB) port, High Definition Multimedia Interface (HDMI), etc. System 300 deinterlaces the interlaced video 302, so that progressive video 310 may be displayed on display 312. System 300 may comprise a mechanism that causes an image (e.g., a frame of video) to be drawn on display 312, as directed by the various components of system 300.

System 300 may use various components to find values for the missing pixels in progressive video 302. An interpolator 314 applies an interpolant to a missing pixel to generate a value for that pixel. The interpolant may be chosen from a set of interpolants 316. The set of interpolants 316 may comprise data and/or logic that implements various interpolation functions. $F_1$ through $F_7$, as described above in equations (2) through (8), are examples of interpolants 316. A data cost calculator 318 may calculate the cost of using various ones of interpolants 316. For example, data cost calculator 318 may implement the technique described above of trying various interpolants on downsampled progressive video to determine how well a given interpolant predicts the actual pixel. System 300 may comprise a downsampler 330, which downsamples interlaced video 302 as previously described in connection with FIG. 2. In one example, data cost calculator 318 contains software that attempts to minimize the value of expression (11), as described above. Based on calculation of data costs, data cost calculator 318 may choose a particular interpolant to interpolate a particular missing pixel of interlaced video 302. This chosen interpolant 320 may be identified to interpolator 314.

Interpolator 314 may calculate an interpolated value 322 for a pixel. The pixel may be displayed at its interpolated value 322, or interpolated value 322 may be provided to refiner 324. Refiner 324 may implement a refinement process, such as the exemplar-based refinement process described above. If exemplar-based refinement is used, then refiner 324 may use a set of exemplars 326. Exemplars 326 may include a generic exemplars and/or exemplars derived from interlaced video 302.

If refinement is not performed, then the pixel is displayed at interpolated value 322. Otherwise, if refinement is performed, then refiner 324 adjusts value 322 in some manner to create a refined value 328 for the pixel, in which case refined value 328 may be displayed.

Progressive video 310 is displayed on display 312. Progressive video 310 comprises pixels that are present in interlaced video 302 as well as pixels that have been interpolated and/or refined from interlaced video 302 using the interpolation and/or refinement processes described herein.

Figure 4:
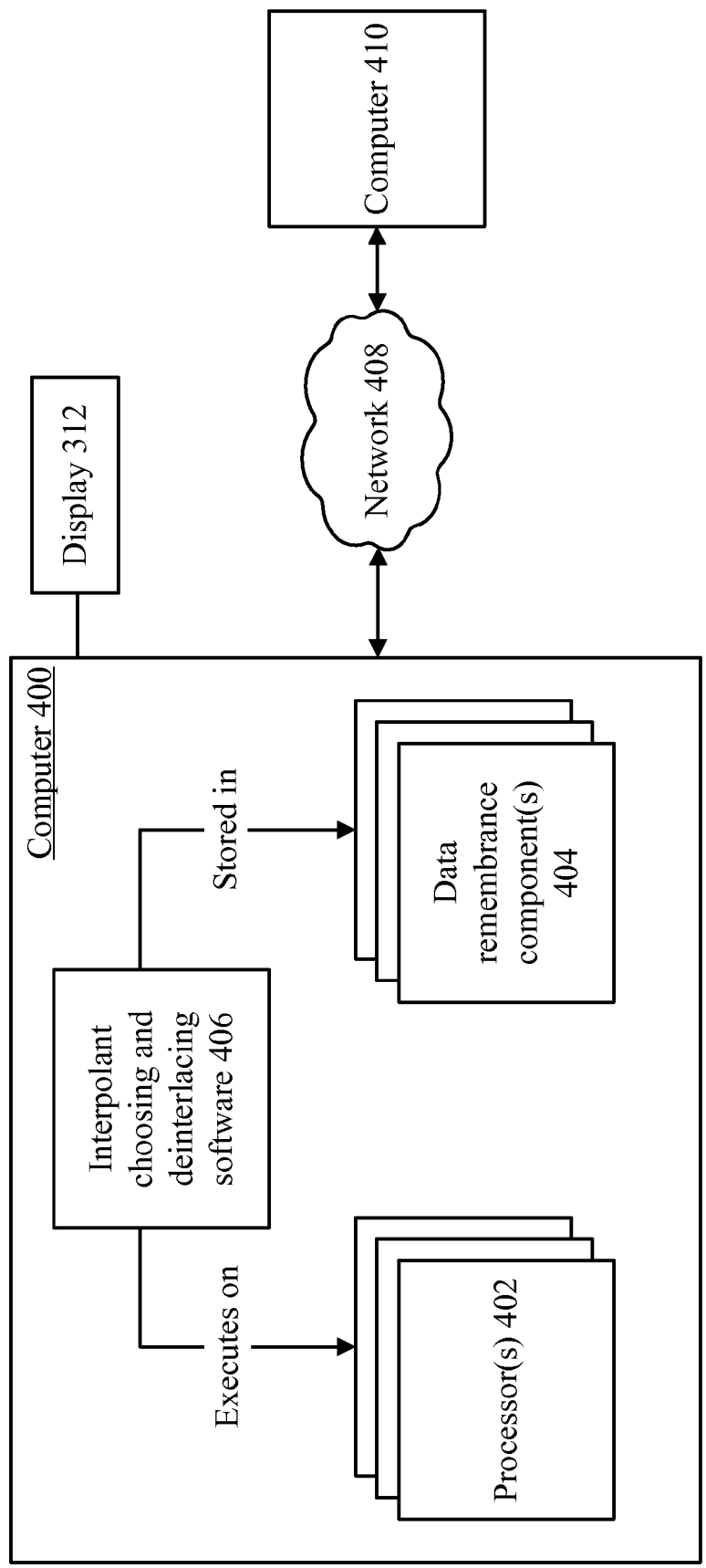
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 312, which may be a cathode ray tube (CRT) monitor, a liquid crystal display (LCD) monitor, a plasma monitor, or any other type of display.

Software may be stored in the data remembrance component(s) 404, and may execute on the one or more processor(s) 402. An example of such software is interpolant choosing and deinterlacing software 406, which may implement some or all of the functionality described above in connection with FIGS. 1-3 (or any other functionality described herein), although any type of software could be used. Software 406 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices comprising executable instructions to perform a method of deinterlacing video, the method comprising:
    calculating data costs of using each of a plurality of interpolants to interpolate a pixel of the video;
    choosing one of said interpolants based on said data costs;
    applying said one of said interpolants to said pixel to produce an interpolated pixel value; and
    displaying a result that is based on said interpolated pixel value, a term being calculated based on a pair that comprises said one of said interpolants and a first interpolant used on a first pixel that is in a neighborhood of said pixel, said term being chosen to be a first value where said one of said interpolants and said first interpolant are a spatial-temporal pair, said term being chosen to be a second value that is lower than said first value where said one of said interpolants and said first interpolant are two spatial interpolants or two temporal interpolants.

2. The one or more computer-readable storage devices of claim 1, wherein said choosing comprises:
    identifying a lowest data cost among said data costs; and
    choosing said one of said interpolants based on said one of said interpolants being associated with said lowest data cost.

3. The one or more computer-readable storage devices of claim 1, further comprising:
    calculating said term based on an amount of regularity, in a neighborhood of said pixel, that results from using said interpolant to interpolate said pixel, wherein said choosing is further based on said term.

4. The one or more computer-readable storage devices of claim 1, wherein said video is interlaced and is at a first resolution, wherein the method further comprises:
    downsampling said video to produce progressive video at a second resolution that is lower than said first resolution, and wherein said calculating of said data costs comprises:
    using said one of said interpolants to produce an interpolated value of a second pixel within said progressive video; and
    comparing, for said second pixel, the second pixel's actual value with the second pixel's interpolated value.

5. The one or more computer-readable storage devices of claim 1, wherein said video comprises interlaced video and is at a first resolution, wherein the method further comprises:
    downsampling said interlaced video to produce progressive video at a second resolution that is lower than said first resolution; and
    identifying a second pixel within said progressive video that corresponds to said pixel in said interlaced video, wherein said data costs are calculated based on performance of said interpolants in said progressive video at said second pixel.

6. The one or more computer-readable storage devices of claim 1, wherein the method further comprises:
    calculating a refinement of said interpolated pixel value based on an exemplar, wherein said result is further based on said refinement.

7. The one or more computer-readable storage devices of claim 1, wherein the method further comprises:
refining said interpolated pixel value based on an exemplar that is taken from said video.

8. The one or more computer-readable storage devices of claim 1, wherein each of the interpolants is a Markov Random Field (MRF) label, wherein the video comprises interlaced video with missing pixels, and wherein said choosing comprises:
finding a labeling of said missing pixels that minimizes data costs.

9. A method of interpolating a first pixel in interlaced video that is at a first resolution, the method comprising:
downsampling said interlaced video to create a first instance of first progressive video that is at a second resolution that is lower than said first resolution;
calculating first data costs associated with using each of a plurality of interpolants to interpolate, based on said first instance, a second pixel in said first instance that corresponds in space and time to said first pixel;
choosing one of said interpolants based on said first data costs;
applying said one of said interpolants to the interlaced video to calculate a first value of the first pixel;
displaying second progressive video at the first resolution, said second progressive video comprising said first pixel with an appearance based on said first value, a term being calculated based on a pair that comprises said one of said interpolants and a first interpolant used on a third pixel that is in a neighborhood of said first pixel, said term being chosen to be a second value where said one of said interpolants and said first interpolant are a spatial-temporal pair, said term being chosen to be a third value that is lower than said second value where said one of said interpolants and said first interpolant are two spatial interpolants or two temporal interpolants.

10. The method of claim 9, wherein said first instance is at a first offset in the interlaced video, wherein a second instance is at a second offset in the interlaced video, and wherein the method further comprises:
identifying, in said second instance, a fourth pixel that corresponds in space in time to said first pixel; and
calculating second data costs associated with using each of said interpolants; wherein said choosing is further based on said second data costs.

11. The method of claim 9, wherein said calculating of first data costs comprises:
for a given one of said interpolants, calculating cost values of using said given one of said interpolants at pixels in a neighborhood of said second pixel; and
averaging said cost values to produce one of said first data costs that is associated with said one of said interpolants.

12. The method of claim 9, further comprising:
calculating a term associated with said one of said interpolants, said term being based on an amount of regularity, in a neighborhood of said first pixel, that results from using said interpolant to interpolate said first pixel, wherein said choosing is further based on said term.

13. The method of claim 9, wherein said choosing comprises:
identifying a lowest data cost among said first data costs; and
choosing said one of said interpolants based on said one of said interpolants being associated with said lowest data cost.

14. The method of claim 9, further comprises:
calculating a refinement of said value of said first pixel based on an exemplar from the interlaced video, wherein said appearance is further based on said refinement.

15. A system comprising:
a display;
an input that receives interlaced video comprising a field having scan lines that alternate as present and not-present;
an interpolator that interpolates, based on said interlaced video, a pixel of said field that is in a not-present scan line;
a refiner that adjusts said pixel from a first value to a second value based on an exemplar from said interlaced video;
a mechanism that causes a progressive frame to be shown on said display, said progressive frame comprising said pixel at said second value; and
a data cost calculator that calculates a data cost of using each of a plurality of interpolants to interpolate said pixel and chooses one of said interpolants based on which of said interpolants has a lowest data cost;
said interpolator interpolating said pixel using said one of said interpolants chosen by said data cost calculator, a term being calculated based on a pair that comprises said one of said interpolants and a first interpolant used on a first pixel that is in a neighborhood of said pixel, said term being chosen to be a first value where said one of said interpolants and said first interpolant are a spatial-temporal pair, said term being chosen to be a second value that is lower than said first value where said one of said interpolants and said first interpolant are two spatial interpolants or two temporal interpolants.

16. The system of claim 15,
said data cost calculator choosing said one of said interpolants from among said plurality of interpolants based on: (a) data costs associated with each of said interpolants, and (b) regularity in a neighborhood of said pixel that results from choosing each of said interpolants;
wherein said interpolator interpolates said pixel using said one of said interpolants chosen by said data cost calculator.

17. The system of claim 15, wherein said interlaced video is at a first resolution, and wherein the system further comprises:
a downsampler that downsamples said interlaced video to create progressive video at a second resolution that is lower than said first resolution
said data cost calculator finding a second pixel within said progressive video that corresponds to said pixel in said interlaced video, uses said interpolants to interpolate said second pixel from said progressive video, and compares an interpolated value of said second pixel with an actual value of said second pixel to calculate data costs associated with each of said interpolants, said data cost calculator choosing one of said interpolants based on said data costs,
wherein said interpolator interpolates said second pixel using said one of said interpolants chosen by said data cost calculator.

18. The system of claim 15, wherein said interlaced video is at a first resolution, and wherein the system further comprises:
a downsampler that downsamples said interlaced video at a plurality of offsets to create first progressive video and second progressive video, said first progressive video and said second progressive video each being at a second resolution that is lower than said first resolution.

* * * * *